United States Patent [19]

Zimmermann

[11] 4,411,113
[45] Oct. 25, 1983

[54] PREFABRICATED AERATION BLOCK FOR SILO BASES

[75] Inventor: Wilhelm Zimmermann, Hamburg, Fed. Rep. of Germany

[73] Assignee: Claudius Peters AG, Fed. Rep. of Germany

[21] Appl. No.: 245,457

[22] Filed: Mar. 19, 1981

[30] Foreign Application Priority Data

Mar. 21, 1980 [DE] Fed. Rep. of Germany ... 8007813[U]

[51] Int. Cl.³ .............................................. E04B 1/70
[52] U.S. Cl. ................................... 52/303; 99/646 R
[58] Field of Search .................. 98/52, 55, 54, 53, 56; 52/198, 247, 302, 303, 801, 192, 197, 646 R

[56] References Cited

U.S. PATENT DOCUMENTS

| 2,818,009 | 12/1957 | Steffen | 98/55 |
|---|---|---|---|
| 3,092,010 | 6/1963 | O'Dell | 52/197 |
| 3,193,971 | 7/1965 | Galloway | 52/302 |
| 3,302,361 | 2/1967 | Oudheusden | 52/801 |
| 3,498,015 | 3/1970 | Seaburg | 52/302 |
| 3,531,874 | 10/1970 | Sukup | 98/55 |
| 3,884,009 | 5/1975 | Frohlich | 52/302 |
| 4,125,977 | 11/1978 | Michlovic | 52/801 |

Primary Examiner—John E. Murtagh
Assistant Examiner—Kathryn L. Ford
Attorney, Agent, or Firm—Eric P. Schellin

[57] ABSTRACT

A prefabricated aeration block for silo bases in which at least two aeration blocks are mounted on the top side of a flat plate and shaped, hollow support sections are fixed on the bottom side of the plate, defining air channels for distribution of air to the aeration blocks.

4 Claims, 2 Drawing Figures

PREFABRICATED AERATION BLOCK FOR SILO BASES

BACKGROUND OF THE INVENTION

1. Field of the Invention

The invention relates to a prefabricated aeration block for silo bases, which is cemented on a bottom plate with an air connection.

2. Prior Art

For emptying, mixing, or homogenizing bulk materials subject to fluidization in silos or partial areas thereof, the materials are in most cases aerated from below. The air is usually supplied via nozzles, mats, fabrics, sintered plastic materials, dry powdered metals, and porous bricks.

Depending on pressure and temperature load, intended use or flow behavior of the bulk materials, one or the other air supply may be more advantageous.

In homogenizing and mixing silos, aeration blocks have prevailed as particularly suitable and advantageous. However, the fixing of the aeration block on the silo base of reinforced concrete, and the durable, dust-proof connection thereof with the air distribution system have always been a problem.

There are blocks that are attached in sheet metal casings, in which structure the sheet metal casings are always provided with an air connection piece. The total expense for material and working time for such constructions is very high.

A further development in this field is the multi-layer aeration block, wherein the air casing is replaced by a coarse-grained structure below a fine-grained top layer. In such a compact block, the air is supplied via a hollow space on the bottom side wherein an air supply line ends.

These blocks may be cemented on flat surfaces or in moist floor plaster. The demands on this cementing and the subsoil are very high. Close tolerances relating to alignment, properties, and consistency of the floor plaster, the ambient temperature, the processing temperature, and the age of the cement must be observed. Moreover, besides great skill of the assembling personnel, observance of a tight time schedule is necessary.

Outside these close tolerances, the quality of the aeration block is questionable. Cracks caused by heat, tension and shrinkage may in individual cases also affect the result.

SUMMARY OF THE INVENTION

An object of the invention is, therefore, to provide an aeration base which is reliable and capable of being mounted rapidly, simply, and independently of disadvantageous external factors, and in addition decrease the warranty and operational risk.

The object is achieved, according to the invention, in that at least two aeration blocks are arranged on a flat plate, and shaped sections on the bottom side of the plate, in which structure the sides of the transversely open shaped sections are welded to the plate.

The advantages achieved by the invention consist especially in that the expense for reliable individual casings is eliminated, and that there exists an independence of the structure of the soil, the age of the cement, the temperature, the floor plaster, the material characteristics on the construction site, and the personnel. The support construction elements are prefabricated in the workshop at favorable cost. The aeration blocks are cemented on under optimal conditions.

According to a particular characteristic of the invention, the shaped sections are arranged below the air connections in labyrinth shape, they are closed at their ends and they are provided with an air connection piece. Thus, the individual connections for the individual aeration blocks are eliminated. The shaped sections form, together with the plate, a hollow space which takes the place of the present complicated pipe system between the individual aeration blocks. This saves space, and the otherwise necessary complicated pipe line distributors are eliminated. The individual support construction elements are provided with air connection pieces which must be connected with the main pipes.

Moreover, the support elements are arranged below the aeration blocks in such a way that, via bores in the contact surface of the support construction element, the aeration blocks are connected with the compressed air guide channels which distribute the air. The usual pipe manifolds which, with a multiplicity of individual connections, must be mounted on the silo base in a precisely aligned manner, can be eliminated. The assembling and manufacturing expenses for such pipe manifolds are considerable.

According to a further characteristic of the invention, the individual aeration blocks can be arranged much more closely than was hitherto the case. A subsequent filling of gaps is thus eliminated. In reinforced concrete bases, the operating gaps between the plates had to be filled up and compacted after placing of the plates in order to pack the porous reinforced concrete material.

Should the pipe line and aerating system with the individual plates happen to be contaminated due to only a single damage (plate cracks), each individual support construction element can, according to the invention, be easily and quickly dismounted from the silo base without employment of compressed air hammers, chisels, or other destructive tools.

According to the invention, several aeration blocks are combined on a plate reinforced by a support structure, and are manufactured in transportable sizes.

The outer periphery of the units, in plan view, is chosen in such a way that several units can be combined in a form-locking manner when placed on a silo base. This requires that the individual elements have either the form of a sector of a circle, so that they fit together in a sector-like way, or the form of a square, rectangle, triangle, or circle segment, so that they can fit together at equal edge length in a mosaic-like manner. Other geometrical forms are also conceivable, namely, a zigzag-shaped side corresponding to the plate shape which permits an engagement of two adjacent elements.

In a particularly economical way, the support construction elements can be manufactured from commercial shaped sections and edge constructions. The fastening to the silo base is most simple with bolts, screws, and pegs.

The manufacture of the elements in a workshop rather than in the often inadequate work conditions on the construction site, ensures a uniform quality. Assembly personnel cost can be saved since the complicated pipe layings and the cementing in moist floor plaster are eliminated. This is particularly important since up to the present time only specially trained and highly qualified people were in a position to observe the required tolerances in the placing of a base. The assembly periods are also considerably shortened. Assembly stoppages at unfavorable temperatures are a thing of the past.

Due to the integration of the air distribution in the support construction elements, the silo base on the whole is built more flatly. The result thereof is that either lower silo construction cost or a greater capacity can be achieved.

All external effects upon the finished silo base, such as shrinkage cracks, tension cracks, and setting cracks can, according to the innovation, no longer affect the aeration base since such effects are neither transmitted to the aeration blocks nor to the adhesive surface.

Even the placing of inclined silo bases does not pose any problems with support construction elements of the invention, whereas the placing of conventional bases would have been further complicated.

When, e.g., existing bases that have become useless are to be repaired, the repair is simple on account of the small demands of the support construction elements on the subsoil. Also, the short assembly periods, as well as the small production stoppage during this period will be advantageous.

Furthermore, the support construction elements corresponding to the innovation permit an easy disassembling when, e.g., an additional silo outlet must be provided at a later time.

In combination, the advantages of the invention reduce the operation risk and the warranty risk, and ensure an impeccable operation of the silo base for many years.

This is particularly important in industry, since silo works are frequently a link in the production chain which comes to a stop upon a breakdown of the silo base.

BRIEF DESCRIPTION OF THE DRAWINGS

An embodiment of the invention is shown in the drawing, wherein.

DETAILED DESCRIPTION OF THE PREFERRED EMBODIMENT

Figure 1:
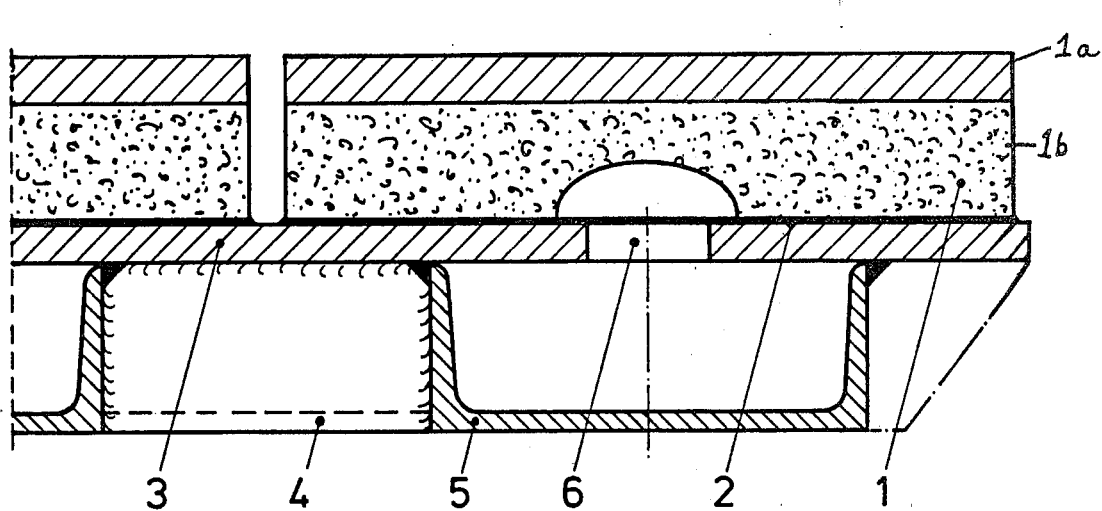
FIG. 1 is a cross-section through a portion of a support construction element with U-sections.

FIG. 1 shows the aeration block 1 comprised of a fine grain layer 1a on a coarse grain layer 1b. The aeration block is cemented at 2 on a flat plate 3. The latter is supported by support construction elements 4 and 5 which also convey and distribute the air via a bore 6 to the aeration blocks.

Figure 2:
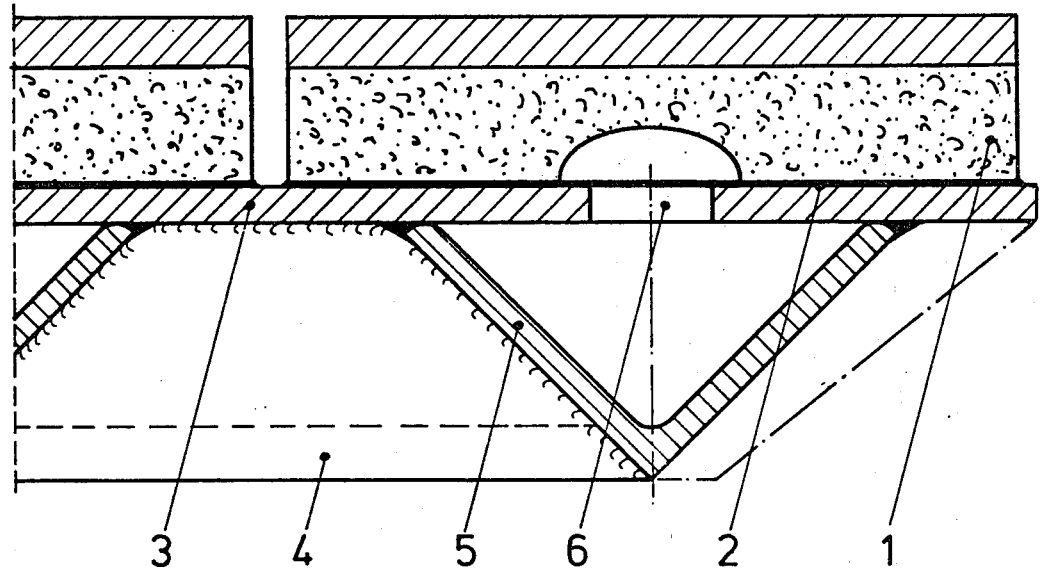
FIG. 2 is a cross-section through a portion of a support construction element with angle sections.

FIG. 2 shows a modification in which angle shapes are shown as support elements and air casing 4' and 5'. In plan view, the support construction elements can be constructed as squares, rectangles, circle segments, circle sectors, triangles, or other geometrical forms (not shown).

What is claimed is:

1. A prefabricated aeration units in a silo bases wherein said silo base is constructed of a plurality of such units comprising, a flat plate having a top side and a bottom side with a plurality of air connecting bores therethrough, a plurality of porous aeration blocks adherently affixed to the top side of the flat plate essentially centrally over said air connecting bores, transversely open shaped manifold air distribution support sections on the bottom side of the flat plate having side walls, the said side walls of the transversely open shaped manifold support sections being fixed to the plate, said units being adapted and constructed whereby a plurality may be disposed to be positioned along a bottom of a silo.

2. The prefabricated aeration units according to claim 1 wherein the porous aeration blocks have a coarse portion sandwiched between a finer upper layer and the flat plate.

3. The prefabricated aeration units according to claim 2 wherein the power aeration blocks have a recessed cavity and the said cavity of said aeration block is positioned over said bore.

4. The prefabricated aeration units according to claim 3 wherein the said flat plate is steel and the side walls of the open shaped manifold air distribution support sections are fabricated of steel and are welded to the bottom plate.

* * * * *